United States Patent
Lee et al.

(10) Patent No.: US 9,660,800 B2
(45) Date of Patent: May 23, 2017

(54) FAST DATA ACQUISITION IN DIGITAL COMMUNICATION

(71) Applicant: NAVITAS SOLUTIONS, Hillsborough, NJ (US)

(72) Inventors: Inseop Lee, Pittstown, NJ (US); Jaesik Lee, Basking Ridge, NJ (US); Minkyu Lee, Ringoes, NJ (US); Andrew M. Chon, Princeton, NJ (US)

(73) Assignee: Navitas Solutions, Hillsborough, NJ (US)

( * ) Notice: Subject to any disclaimer, the term of this patent is extended or adjusted under 35 U.S.C. 154(b) by 0 days.

(21) Appl. No.: 15/035,153

(22) PCT Filed: Nov. 6, 2014

(86) PCT No.: PCT/US2014/064271
§ 371 (c)(1),
(2) Date: May 6, 2016

(87) PCT Pub. No.: WO2015/069850
PCT Pub. Date: May 14, 2015

(65) Prior Publication Data
US 2016/0294543 A1    Oct. 6, 2016

Related U.S. Application Data

(60) Provisional application No. 61/900,770, filed on Nov. 6, 2013.

(51) Int. Cl.
*H04L 7/04* (2006.01)
*H04L 25/02* (2006.01)
*H04L 1/00* (2006.01)

(52) U.S. Cl.
CPC ............ *H04L 7/048* (2013.01); *H04L 1/00* (2013.01); *H04L 1/0045* (2013.01); *H04L 25/02* (2013.01)

(58) Field of Classification Search
CPC ......... H04L 7/048; H04L 1/0045; H04L 1/00; H04L 25/02
See application file for complete search history.

(56) References Cited

U.S. PATENT DOCUMENTS 7,664,164 B1 * 2/2010 Giallorenzi .......... H04B 1/7075
375/130
2002/0031198 A1    3/2002 Eglit
(Continued)

FOREIGN PATENT DOCUMENTS

WO    2012168383    12/2012

OTHER PUBLICATIONS

International Search Report and Written Opinion dated Feb. 15, 2015 for PCT/US2014/064271.

*Primary Examiner* — Jean B Corrielus
(74) *Attorney, Agent, or Firm* — Fox Rothschild LLP; Robert J. Sacco; Carol E. Thorstad-Forsyth

(57) ABSTRACT

Method for data communication involves receiving with a radio receiver a data signal containing a plurality of data symbols. An analog to digital converter obtain a sample of the data signal at periodic intervals to define a sampling rate which is N times a symbol rate. Thereafter, at least one processing device allocates each sample obtained to a respective one of N sampled data streams in accordance with an allocation sequence, and repeats the allocation sequence after every N samples so that each of the N sampled data streams has a data stream symbol rate equal to the symbol rate. Thereafter, a plurality of data stream data sets defined by the N sampled data streams are validated. Once the validation is completed, a plurality of groups are determined, each comprised of two or more of the stream data sets which have been validated and are identical.

10 Claims, 5 Drawing Sheets

(56) References Cited

U.S. PATENT DOCUMENTS

| | | | |
|---|---|---|---|
| 2002/0082500 A1* | 6/2002 | Henderson | G01S 7/52095 600/443 |
| 2009/0016467 A1 | 1/2009 | Lui et al. | |
| 2010/0295608 A1 | 11/2010 | Yang et al. | |
| 2013/0076545 A1* | 3/2013 | Sugimoto | H03M 1/0836 341/118 |
| 2013/0120036 A1 | 5/2013 | Zhu et al. | |
| 2016/0302102 A1* | 10/2016 | Hassan | H04L 5/0053 |

\* cited by examiner

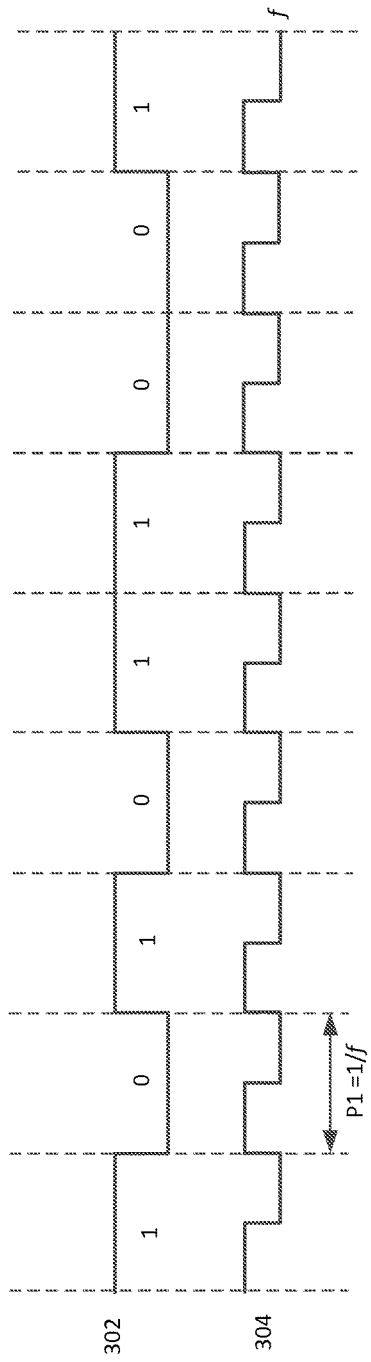
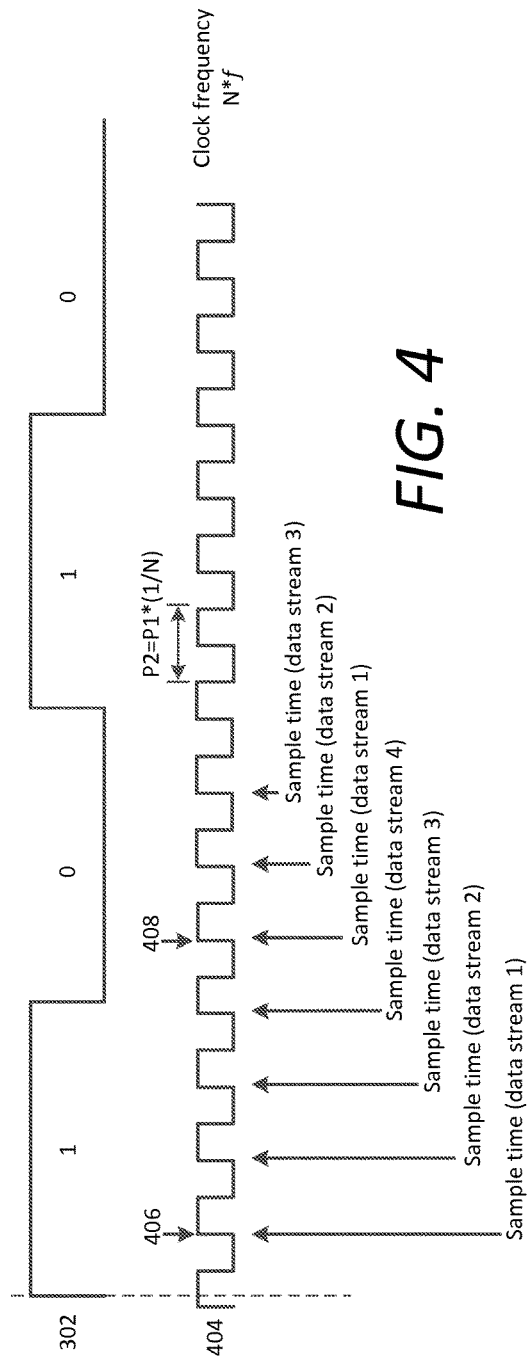

FAST DATA ACQUISITION IN DIGITAL COMMUNICATION

The present application claims benefit of International (PCT) Patent Application No. PCT/US2014/064271, filed on Nov. 6, 2014 and entitled "FAST DATA ACQUISITION IN DIGITAL COMMUNICATION", and U.S. Provisional Patent Application Ser. No. 61/900,770 filed on Nov. 6, 2013 and entitled "FAST DATA ACQUISITION IN DIGITAL COMMUNICATION." The contents of these two patent applications are incorporated herein by reference in their entirety.

BACKGROUND OF THE INVENTION

Statement of the Technical Field

The present invention is in the technical field of digital communications. More particularly, methods and systems for fast data acquisition and synchronization of transmitters and receivers.

Description of the Related Art

In digital communication systems, the performance of synchronization processing during demodulation and data recovery from received signal has become an important issue. In general digital communication systems, a transmitter sends digital information synchronized with a remote clock. A receiver recovers the transmitted signal by sampling with a local clock. Since the remote clock and local clock are from different sources, a synchronization process should be performed at the receiver for proper demodulation of the transmitted signal. Synchronization is implemented by adjusting a fractional time delay between a remote clock and a local clock. In other words, the sampling phase of a local clock is adjusted to achieve the maximum eye opening (i.e. minimal signal distortion).

This synchronization process is necessary for all digital communication systems, but requires complex hardware and substantial processing time to achieve reliable performance. Also, a sampling clock should be synchronized to a received signal for the entire communication period during which a signal is received. For initial synchronization and to maintain symbol synchronization, a preamble is typically inserted at the beginning of a frame. It is periodically repeated until the end of communication.

In some applications such as radio frequency identification (RFID), near field communication (NFC), and sensor networks, for example, the amount of data to be transferred between a transmitter and a receiver is relatively small. This is particularly true in a wireless sensor networks, because synchronization time and data frame length determines the maximum number of nodes and/or a monitoring rate. Therefore, synchronization time is an important design factor.

SUMMARY OF THE INVENTION

Embodiments of the invention concern a method for data communication. The method involves receiving a data signal containing a plurality of data symbols with a radio receiver. The data symbols are transmitted to the receiver at a data signal symbol rate. The data symbols define a data frame containing a set of digital data. An analog to digital converter is used to obtain a sample of the data signal at periodic intervals to define a sampling rate which is N times the symbol rate of the received data signal, where N is an integer value. Thereafter, at least one processing device allocates each sample obtained to a respective one of N sampled data streams in accordance with an allocation sequence, and repeats the allocation sequence after every N samples so that each of the N sampled data streams has a data stream symbol rate equal to the symbol rate of the received data signal. The processing device also validates a plurality of data stream data sets defined by the N sampled data streams. Once the validation is completed, the processing device determines a plurality of groups, each comprised of one or more of the stream data sets which have been validated and are identical. The processing device then outputs for further processing a data stream set from the group having the greatest number of validated data stream sets.

The invention also concerns a data communication receiver. The data communication receiver includes a radio receiving circuit which receives a data signal comprising a plurality of data symbols which have been transmitted in accordance with a data signal symbol rate. The data symbols define a data frame containing a set of data. An analog-to-digital converter obtains samples of the data signal at periodic intervals to define a digitized data signal having a sampling rate which is N times the symbol rate of the received data signal, where N is an integer value. A plurality of delay elements selectively delay the digitized data signal to produce N digitized data signals, each having a different relative delay. Thereafter, a plurality of N stream generators generate a total of N sampled data streams respectively from the N digitized data signals by sampling the N digitized data signals at the same time (e.g., using the same clock signal). Each of the N sampled data streams have a data stream symbol rate that is equal to the symbol rate of the received data signal. A plurality of N validation modules are arranged to selectively validate a plurality of data stream data sets defined by the N sampled data streams. A selection processor receives the plurality of stream sets which have been validated and determines a plurality of groups. Each group is comprised of one or more of the stream data sets which have been validated and are identical. The selection processor selectively outputs for further processing a data stream set from the group having the greatest number of validated data stream sets.

BRIEF DESCRIPTION OF THE DRAWINGS

Embodiments will be described with reference to the following drawing figures, in which like numerals represent like items throughout the figures, and in which:

FIG. 3 is a first timing diagram that is useful for understanding a communication system having a fast data acquisition.

FIG. 4 is a second timing diagram that is useful for understanding a communication system having a fast data acquisition.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
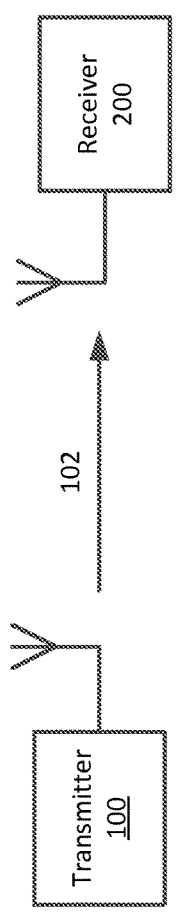
FIG. 1 is a diagram that is useful for understanding a digital communication system in which a receiver has a fast data acquisition capability.

Referring now to FIG. 1 there is shown a digital communication system which includes a transmitter 100 and a receiver 200. For purposes of disclosing the inventive arrangements, a wireless digital communication system will be shown and described. However, it should be understood that the invention is not limited in this regard. Instead, the inventive arrangements can be implemented in both wired and wireless communication systems. In FIG. 1, the transmitter 100 communicates digital data to the receiver 200 over a wireless radio link 102. The digital data can be transmitted using a radio frequency (RF) carrier signal which is modulated using any suitable digital modulation scheme to define a plurality of data symbols. Exemplary modulation schemes which can be used for this purpose include amplitude shift keying (ASK), frequency shift keying (FSK), phase shift keying (PSK) and quadrature amplitude modulation (QAM) methods. Each data symbol is a state or condition of the transmitted waveform that persists for a fixed period of time known as a symbol duration time. As is known, each data symbol can represent an integer number of binary data bits. The transmitter 100 transmits symbols over the communication channel at a fixed and known rate defined as the symbol rate. The receiver detects the symbols which have been sent to reconstruct the data bits that have been communicated.

Figure 2:
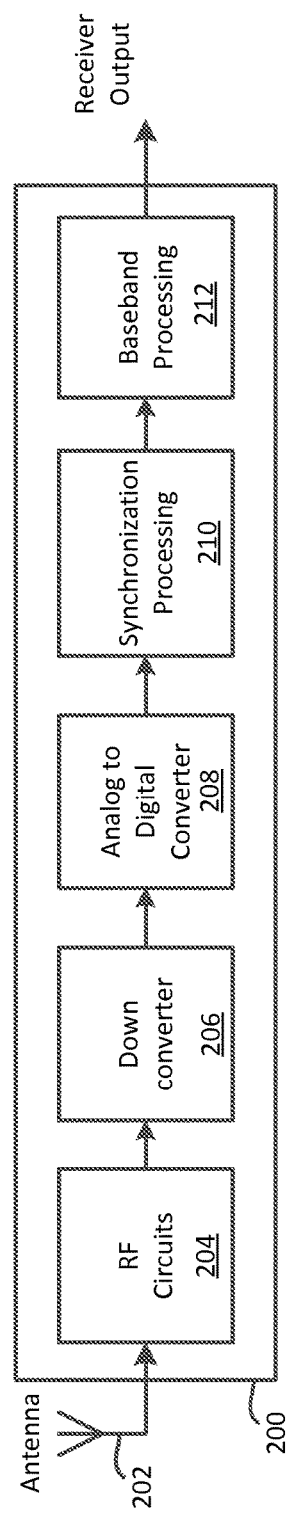
FIG. 2 is a diagram that is useful for understanding a receiver used in a digital communication system having a fast data acquisition capability.

Referring now to FIG. 2, there is illustrated a simplified block diagram of an exemplary wireless receiver 200 used in a digital communications system as described herein. The receiver 200 can be connected to an antenna 202 for receiving radio frequency (RF) signals over one or more frequencies. The receiver includes RF circuits 204 which can include RF filters and amplifiers for processing RF signals. The output of the RF circuits is communicated to a down-converter 206 which down-converts received RF signals to a baseband signal having a lower frequency. In some receiver circuits, no down-conversion is needed and therefore the down-converter can be omitted in such systems. The baseband signal is communicated to an analog to digital (A/D) converter 208. The A/D converter samples the analog signal at periodic intervals to generate a digital output which is representative of the analog input signal. The periodic interval at which the A/D converter performs such sampling is sometimes referred to herein as a sampling rate. The A/D converter converts the analog baseband signal to digital format to facilitate certain synchronization operations baseband processing as described herein. The digitized signal from the A/D converter 208 is communicated to a synchronization processor 210 and then to a baseband signal processing module 212. Receiver components such as the RF circuits 204, down-converter 206, A/D converter 208, and baseband processing section 212 are all well known in the art and therefore will not be described in detail.

Referring now to FIG. 3, there is shown a transmitter timing diagram that is useful for understanding a synchronization process according to the inventive arrangements. FIG. 3 shows a data signal 302 sent from the transmitter 100 and a clock signal 304 at transmitter 100. The data signal shown is a small portion of a larger data frame that is generated at the transmitter and communicated to the receiver 200. In this example, the clock signal has a frequency f so the period P1 of each clock cycle is 1/f. The clock signal determines a symbol rate for the data signal 302 and it can be observed in FIG. 3 that the symbol rate is also f. In order to simplify the discussion, each symbol in FIG. 3 represents only a single data bit as shown. For example, a first symbol 306 defines a binary data bit value of 1. A second data symbol 308 defines a binary data bit value of 0. A third symbol 310 defines a data bit value of 1. Accordingly, it may also be observed in FIG. 1 that the data in the data signal represents a bits stream of "101011001" and that the symbol rate of the data signal is fully synchronized with the clock signal.

The data signal 302 can be transmitted from transmitter 100 to the receiver 200 using conventional methods similar to those described herein with respect to FIGS. 1 and 2. After the data signal is received, a receiver clock signal must be used to recover the data contained in the data signal. As is known, the receiver clock signal is of great important for purposes of recovering data because the receiver clock signal will determine the times when the data signal 302 will be sampled for purposes of recovering data. If the data signal is sampled at the wrong time (e.g. due to synchronization errors) the receiver will not recover the correct data from the received data signal.

In a conventional receiver, synchronization is implemented by adjusting a fractional time delay between a remote transmitter clock and a local receiver clock. Synchronization ensures that the local receiver clock will sample each data symbol at an optimal time to estimate its symbol value. But a conventional synchronization process used in a digital communication system requires complex hardware and substantial processing time to achieve reliable performance. For initial synchronization and to maintain symbol synchronization during each frame of a digital data signal, a relatively long preamble is typically inserted at the beginning of the frame. The preamble is periodically repeated until the end of communication. Accordingly, synchronization processing in a conventional digital data communication system can involve a substantial amount of processing and data overhead. The processing and data overhead can be unacceptable in a data communication system where data is communicated infrequently and where only a relatively small amount of data is being communicated in each frame.

In order to overcome these deficiencies in prior art communication systems, a method and system are disclosed in which there is no need for a synchronization preamble. According to one aspect, samples of a received data signal are obtained at a sampling rate which is N times the symbol rate of the received data signal. Thereafter, as each sample is obtained, it is allocated to a respective one of N sampled data streams in accordance with an allocation sequence. The allocation sequence is repeated after every N samples. Each sample comprises an instantaneous measurement of the digital data signal and is used in one of the sampled data streams to represent a symbol in that data stream. Notably, each successive sample is obtained sequentially at a slightly different time. Accordingly, it is expected that the symbol data allocated to each of the N sampled data streams may vary since the symbol value changes with time on a regular basis. As each frame of received data is processed in this way, there will be generated N sampled data streams, each defining a data set (e.g. a frame of data). Thereafter, as each group of N data sets is generated, a validation process is used to select one or more of the data sets which are deemed to be error free. Once the validation is completed, the validated data sets are arranged in groups. Each group is comprised of one or more of the data sets which are determined to be identical. Thereafter, one data set is output from the group which is determined to have the greatest number of validated data stream sets contained therein.

FIG. 4 is useful for understanding how N separate data streams can be generated from a single received data signal. FIG. 4 shows an enlarged view of data signal 302 after such signal has been received at receiver 200. Also shown in FIG. 4 is a clock signal 404 which is generated at the receiver 200. N sampled data streams are generated by sampling the data signal 302 using the clock signal 404 which has a clock frequency N*f (where f is also the symbol rate of the received data signal). In the example shown, N=4 and the clock signal at the receiver has a frequency 4f, such that four distinct sampled data streams are generated. In this example, the N sampled data streams are generated by sampling the data signal 302 at a leading edge of the receiver clock as shown; however it should be understood that other sampling times are also acceptable.

Note that in FIG. 4, the sample time for sampled data stream 2 is always delayed with respect to the sample time for sampled data stream 1 at an interval of P2=1/Nf=P1*(1/N). As each sample is obtained, it is allocated to a respective one of N sampled data streams in accordance with an allocation sequence. The allocation sequence is repeated after every N samples. In this regard, it may be observed in FIG. 4, that a new sample for a particular sampled data stream is obtained after N clock cycles. For example, it can be observed in FIG. 4 that the sample time for sampled data stream 1 occurs at time 406 and repeats again at 408 after N clock cycles.

Figure 5:
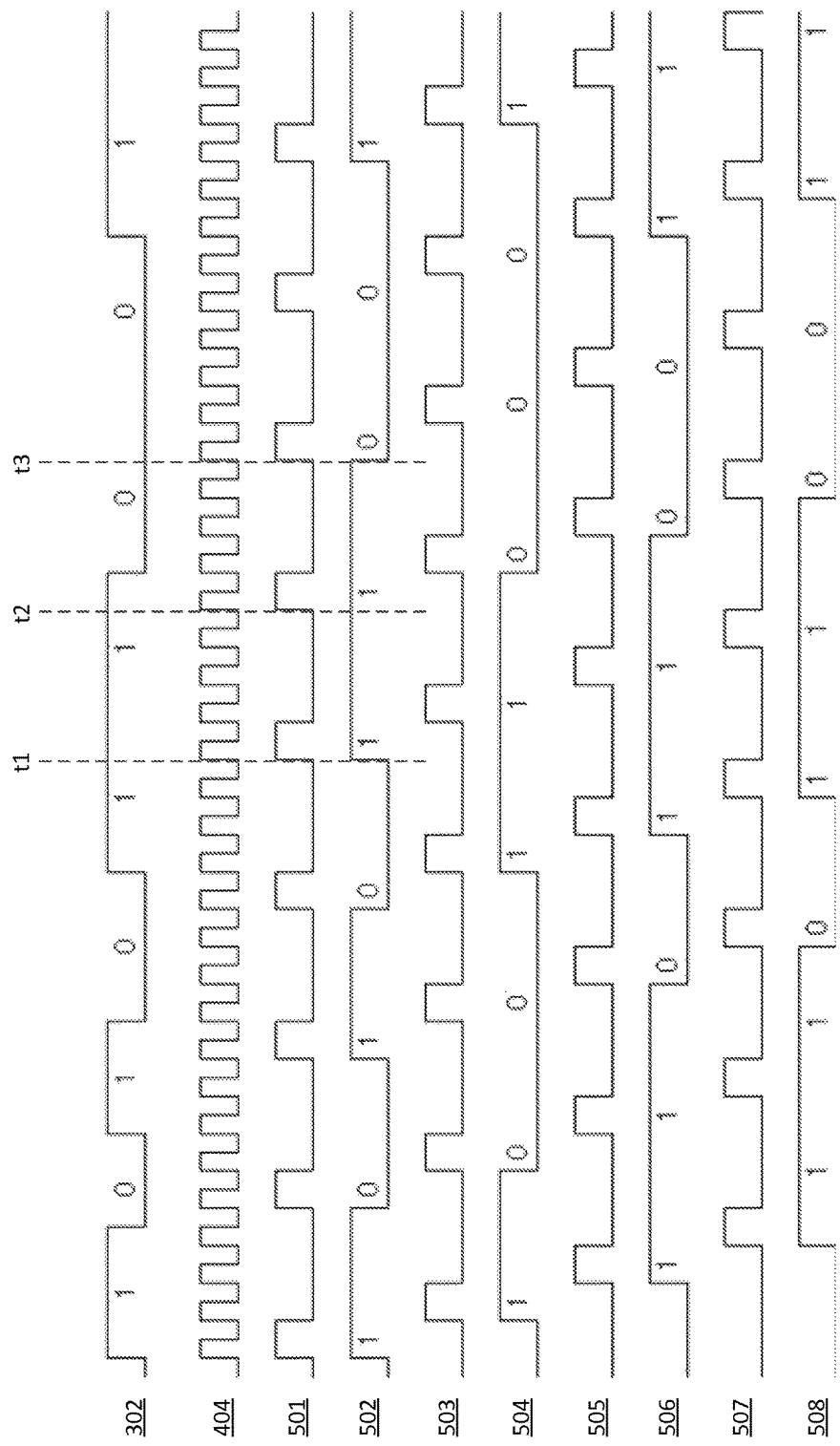
FIG. 5 is a third timing diagram that is useful for understanding a communication system having a fast data acquisition.

From the foregoing it will be understood that it is possible to generate N separate sampled data streams based on the single received data signal 302. This concept is further illustrated in FIG. 5, which shows an example in which four separate sampled data streams 502, 504, 506, 508 are generated from data signal 302 with a receiver clock signal 404 having a clock frequency 4f that is four times the symbol rate (f). Note that in FIG. 4 and in FIG. 5, a relative timing of the received data signal 302 and the local receiver clock signal 404 is actually time varying because a transmitter clock 304 and the receiver clock signal 404 are not synchronized. Also shown in FIG. 5 are four data stream clock signals 505, 506, 507, 508 which can be derived or generated from the receiver clock signal 404. The four data stream clock signals are used to specify four different sampling points in a manner similar to that described herein with respect to FIG. 4. The four different data stream clock signals will have four different delays relative to the receiver clock signal 404. Notably, since the data stream clock signals are derived from the receiver clock signal 404, a relative timing of the data stream clock signals will be synchronized with the receiver clock signal 404, but will be unsynchronized with respect to the transmitter clock signal. Accordingly, the data stream clock signals will also be unsynchronized with the symbol timing of the received data signal.

In the example shown in FIG. 5, a sample of the data signal 302 is obtained for each sampled data stream 502, 504, 506, 508 at a time respectively corresponding to a leading edge of each data stream clock signal 505, 506, 507, 508. For example it can be observed that a leading edge of a clock signal 501 occurs at a time t1, specifying a sample time for sampled data stream 502. Since data signal 301 has a symbol value of 1 at this sample time, sampled data stream 502 transitions t1 from a 0 state to a 1 state. Similarly, a leading edge of clock signal 501 occurs at time t2. Data signal 302 has a symbol value of 1 at time t2. Accordingly, the data stream 502 remains in a 1 state at time t2. A further leading edge of clock signal 501 occurs at time t3 At time t3, the data signal 302 has a symbol value of 0. Accordingly, sampled data stream 502 transitions at t3 from a 1 state to a 0 state. Each of the sampled data streams 502, 504, 506, 508 is generated in this way. Note that since the data stream clock signals 505, 506, 507, 508 each has a different delay (specifying different sample times), the resulting sampled data streams 502, 504, 506, 508 may be generated with the same or different data. In the example of FIG. 5, only sampled data stream 502 shows the correct stream (i.e. "101011001"). One of ordinary skill will see that higher sampling rates (i.e. a higher value of N) will produce more sampled data streams. With an overall increase in the number of sampled data streams, it can be expected that there will be an increase in the number of such sampled data streams that contain incorrect data, but there will also be an increase in the number of sampled data streams that contain correct data.

Figure 6:
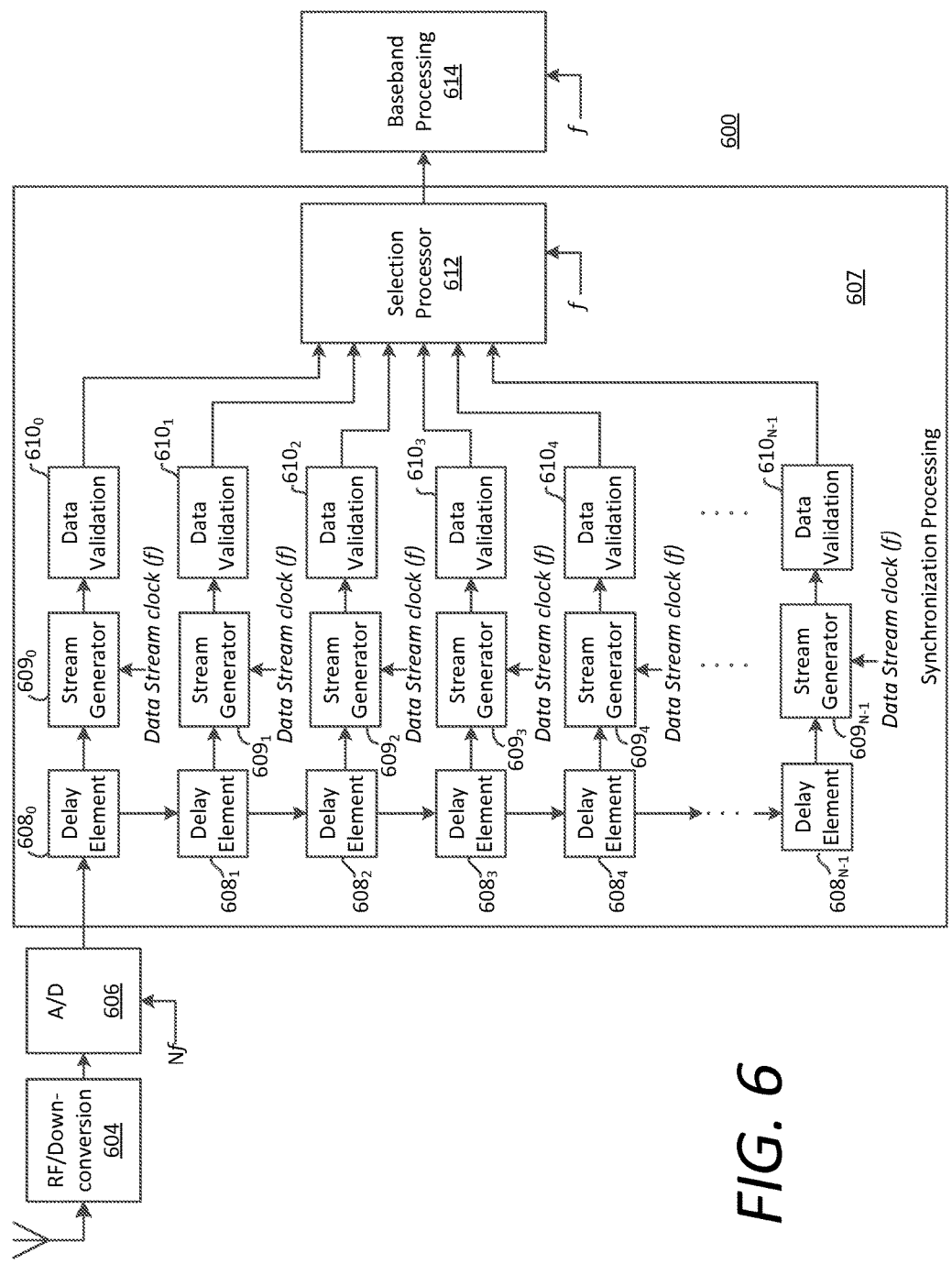
FIG. 6 is a block diagram of a receiver that is useful for understanding a timing synchronization system for fast data acquisition.

Referring now to FIG. 6, there is shown a simplified architecture of a radio receiver 600 which is useful for understanding the inventive arrangements described herein. In FIG. 5, the data streams clocks 501, 503, 505, and 507 were described as having different delays relative to each other. The variation in such delays among the data stream clocks ensured that the exact time when the digitized data signal was sampled would be different for purposes of generating each of the different sampled data streams. In FIG. 6 a slightly different approach is used to achieve what is essentially the same result.

The radio receiver in FIG. 6 can include RF/downconversion circuits 604 similar to those described in FIG. 2. The radio receiver can also include an analog to digital (A/D) converter 606 which converts incoming baseband analog signals to a digital format to facilitate further processing. The A/D converter is advantageously selected to perform A/D conversions at a rate Nf where f is the symbol rate of the received data signal.

The radio receiver 600 receives a modulated RF signal which contains a digital data signal, such as digital data signal 302. The digital data samples are output from A/D converter 606 to a synchronization processing section 607. The synchronization processing section 607 shown in FIG. 6 represents one possible architecture for implementing the inventive methods described herein. The synchronization processing section contains a set of delay elements $608_0$, $608_2$, $608_3$ ... $608_{N-1}$. Beginning with delay element $608_0$, each delay element delays the digitized data signal by a period of time corresponding to 1/N, where N represents a number of sampled data streams to be generated. After each delay, the digitized data signal is passed to the next delay element until it reaches the final delay element $608_{N-1}$. After being delayed, the digitized data signal from each delay element is also communicated to a respective stream generator $609_0, 609_2, 609_3 \ldots 609_{N-1}$.

At each stream generator $610_0, 610_2, 610_3 \ldots 610_{N-1}$, a sampled data stream is generated using a data stream clock. The sampled data streams generated by the data stream generators in FIG. 6 are similar to the sampled data streams 502, 504, 506, 508 in FIG. 5. In the embodiment shown in FIG. 6, a plurality of digitized data signals 304 with different delays are created using the delay elements $608_0, 608_2, 608_3 \ldots 608_{N-1}$. Thereafter, a single data stream clock having a clock frequency f is used at data stream generators $609_0, 609_2, 609_3 \ldots 609_{N-1}$, to control a sample time of each digitized data signal. Note that with this approach, the timing of the data stream clock signal does not need to be varied or delayed for generating each sampled data stream. Instead, the variation in the generated sampled data streams is obtained by creating N versions of the incoming digital data signal, each having a different delay. The N versions of the digital data signal can then be sampled using a single common clock signal. The variation in sample times is thus obtained by selectively delaying each of the N versions of the incoming data signal. The result is a plurality of sampled data streams similar to sampled data streams 502, 504, 506, 508 shown in FIG. 5.

Once the N sampled data streams have been sampled as described herein, a validation process is performed in data validation modules $610_0, 610_2, 610_3 \ldots 610_{N-1}$. According to one aspect, the validation performed in each data validation module can be achieved using a conventional error detection or error correction process as is used to ensure communication reliability in digital communications. Conventional error detection and/or error correction processes can involve modifying or appending (at the transmitter) certain data bits contained in a frame of digital data to facilitate detection and/or correction of errors at the receiver. As is known, error-correcting code can be used for error detection. A code with minimum Hamming distance, d, can detect up to d−1 errors in a code word. Examples of these conventional processes include methods that use repetition codes, parity checks, checksums, and cyclic redundancy codes (CRC). All of these methods comprise well known error detection schemes that are widely used in digital communications and therefore will not be described in detail.

Figure 7:
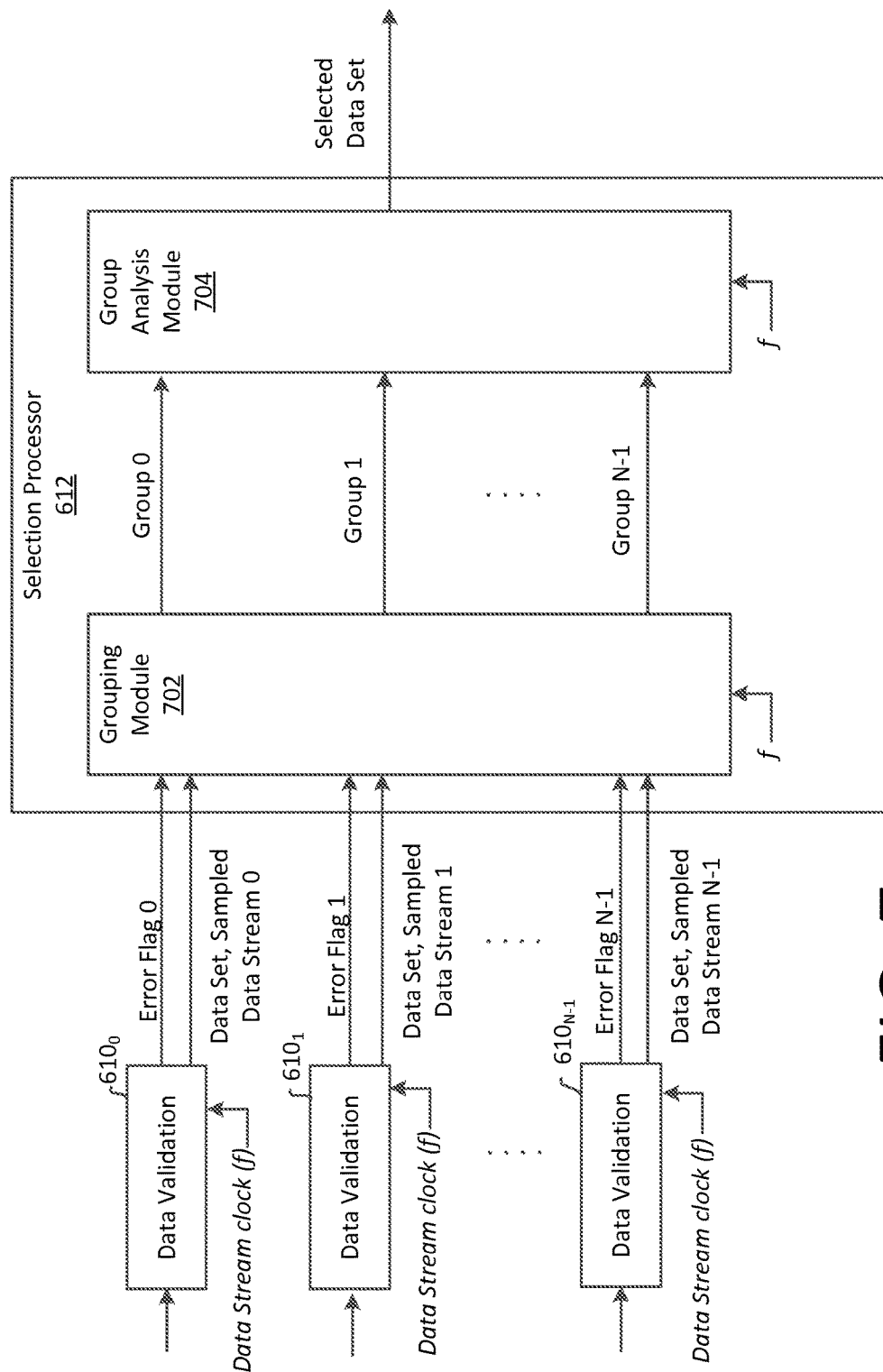
FIG. 7 is a more detailed block diagram showing portions of the timing synchronization system in FIG. 6.

Referring now to FIG. 7, it can be observed that the data validation modules $610_0, 610_2, 610_3 \ldots 610_{N-1}$, can produce an error flag with each frame or set of the N sampled data streams. The error flags (Error Flag 0, Error Flag 1, . . . Error Flag N−1) will indicate whether a particular frame of data (data set) for the corresponding data stream contains any errors. When an error correction scheme is used, the output of the data validation block includes an error flag and a corrected data stream. If the data validation block is capable of correcting all of the errors in the data stream, then the corrected data stream is an error free stream. For example, the number of errors in the data stream may be less than the maximum number of errors the error correction scheme can correct. In a scenario where all the errors in a particular data stream are corrected, the error flag associated with the corrected data stream is set to indicate that the corrected data stream is error free. Otherwise, if all the errors in the data stream cannot be corrected, the error flag will be set to indicate the presence of errors in the output data stream. Examples of error correcting codes include Reed-Solomon codes, Turbo codes, low-density parity-check (LDPC) codes, Viterbi decoder, and the like. However, any method of error detection or correction can be used without limitation. These codes can be used for the validation process without modification.

After validation in the data validation modules $610_0, 610_2, 610_3 \ldots 610_{N-1}$, it is possible to have multiple valid data streams available. In other words, two or more data sets for sampled data streams 0, 1, 2, . . . N−1 may have error flags which indicate the corrected data stream is error free. But due to the inherent limitations of error correcting codes, one or more of the so called corrected data sets may in fact contain data which is not correct. Since the size of parity bits within the data stream is limited, it is possible to have different data sets from multiple sampled data streams but with the same parity bits. The result is a false selection or a false indication that a data set is correct. A false selection occurs when a stream passes the validation process but the contents do not match the transmitted stream.

To choose one data set from all data streams which have been flagged as valid or correct, a selection scheme is required. Accordingly, after the validation process in the data validation modules $610_0, 610_2, 610_3 \ldots 610_{N-1}$, each data stream and error flag pair is sent to the grouping module 702. In the grouping module, each data set corresponding to a particular sampled data stream is compared with the data set from all other sampled data streams. In grouping module 702, all identical data sets from sampled data streams are grouped together. As a result of this grouping process, each group will have one or more data sets with the same data content, but obtained from different data streams. There can be as many as N−1 groups.

Thereafter, in group analysis block 704, a count is performed as to the number of data sets in each group. The count represents the number of sampled data streams that have produced a particular validated data set. The group that has the highest count is selected, provided that the count exceeds a predetermined threshold. A representative data set from that particular group is then sent to a baseband processing block for further demodulation.

The methods and systems disclosed herein increases the number of nodes that can be monitored and/or controlled in a certain time. It also increases node monitoring and/or controlling rate. It also simplifies the design of frontend in a digital communication system. Additionally, the methods and systems disclosed herein eliminate the need for symbol synchronization. Frame synchronization is still desirable to determine the starting point of each frame.

The radio receiver and the associated synchronization system described herein can be realized in one computer system or in several interconnected computer systems. Any kind of computer system or other apparatus adapted for carrying out the processing described herein is suited. Suitable hardware can include a microprocessor, digital signal processor (DSP) and/or a general-purpose computer system. A computer program can control the hardware such that it carries out the methods described herein.

Those skilled in the art will appreciate that the system architecture illustrated in FIGS. 4 and 7 represent one possible example of a receiver system as described herein. However, the invention is not limited in this regard and any other suitable system architecture can also be used without limitation. Dedicated hardware implementations for the synchronization processing include, but are not limited to, application-specific integrated circuits, programmable logic arrays, and other hardware devices can likewise be constructed to implement the methods described herein. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, certain synchronization methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for data communication, comprising:
    receiving with a radio receiver a data signal containing a plurality of data symbols which have been transmitted in accordance with a data signal symbol rate, the data symbols comprising a data frame containing a set of data;
    using an analog to digital converter to obtain a sample of the data signal at periodic intervals to define a sampling rate which is N times the symbol rate, where N is an integer value of at least 4;
    allocating, using at least one processing device, each sample obtained to a respective one of N sampled data streams in accordance with an allocation sequence, and repeating the allocation sequence after every N samples so that each of the N sampled data streams has a data stream symbol rate equal to the data signal symbol rate,
    validating, using the at least one processing device, a plurality of data stream data sets defined by the N sampled data streams;
    determining, using the at least one processing device, a plurality of groups, each comprised of one or more of the stream data sets which have been validated and are identical, and
    outputting by the at least one processing device, for further processing, a data stream set from the group having the greatest number of validated data stream sets.

2. The method according to claim 1, further comprising selecting the data signal to exclude a symbol synchronization preamble.

3. The method according to claim 1, wherein the step of using the analog to digital converter to obtain the sample of the data signal at periodic intervals further comprises generating N copies of the data signal, each having a different relative time delay.

4. The method according to claim 1, wherein the step of using the analog to digital converter to obtain the sample of the data signal at periodic intervals further comprises generating N data stream clock signals each having a different relative time delay.

5. The method according to claim 1, further comprising using an error detection scheme to facilitate the validating step.

6. The method according to claim 1, further comprising using an error correction scheme to facilitate the validating step.

7. The method according to claim 1, wherein N is a value between 4 and 16.

8. The method according to claim 1, wherein the number of groups is between two and N−1.

9. A data communication receiver, comprising:
    a radio receiving circuit which receives a data signal comprising a plurality of data symbols which have been transmitted at a data signal symbol rate, the data symbols comprising a data frame containing a set of data;
    an analog-to-digital converter which obtains samples of the data signal at a sampling rate which is N times the data signal symbol rate to form a digitized data signal, where N is an integer value of at least 4;
    a plurality of delay elements which selectively delay the digitized data signal to produce N of the digitized data signals, each having a different relative delay;
    a plurality of N stream generators which generate a total of N sampled data streams respectively from the N digitized data signals by sampling the N digitized data signals at the same time, each of the N sampled data streams having a data stream symbol rate equal to the data signal symbol rate;
    a plurality of N validation modules arranged to selectively validate a plurality of data stream data sets defined by the N sampled data streams;
    a selection processor which receives the plurality of stream sets which have been validated and determines a plurality of groups, each comprised of one or more of the stream data sets which have been validated and are identical, the selection processor selectively outputting for further processing a data stream set from the group having the greatest number of validated data stream sets.

10. The data communication receiver according to claim 9, wherein the N validation modules use one of an error detection and an error correcting decoding scheme to determine if each data stream set is validated.

* * * * *